United States Patent
Tomor et al.

(10) Patent No.: US 12,011,745 B2
(45) Date of Patent: Jun. 18, 2024

(54) BALL VALVE WITH DOWNSTREAM RESIDUE PURGE

(71) Applicant: Flowserve Management Company, Irving, TX (US)

(72) Inventors: András Tomor, Érd (HU); Péter Tóth, Zalaegerszeg (HU); Aryoso Nirmolo, Villach (AT); Christopher Brydon, Reno, NV (US); Christopher R. Shages, Bethlehem, PA (US); Larry D. Ray, Jr., Baytown, TX (US)

(73) Assignee: Flowserve Pte. Ltd., Singapore (SG)

(*) Notice: Subject to any disclaimer, the term of this patent is extended or adjusted under 35 U.S.C. 154(b) by 0 days.

(21) Appl. No.: 17/984,668

(22) Filed: Nov. 10, 2022

(65) Prior Publication Data

US 2024/0157407 A1  May 16, 2024

(51) Int. Cl.
*F16K 5/06* (2006.01)
*B08B 3/02* (2006.01)
*B08B 3/08* (2006.01)
*B08B 5/02* (2006.01)
*F16K 5/08* (2006.01)

(52) U.S. Cl.
CPC .............. *B08B 3/02* (2013.01); *B08B 3/08* (2013.01); *B08B 5/02* (2013.01); *F16K 5/06* (2013.01); *F16K 5/08* (2013.01)

(58) Field of Classification Search
CPC ... F16K 5/06; F16K 5/227; F16K 5/08; F16K 5/22; F16K 5/2067; F16K 2200/402; Y10T 137/043
See application file for complete search history.

(56) References Cited

U.S. PATENT DOCUMENTS 6,578,598 B2 * 6/2003 Gardner ................ F16K 27/067
251/315.1

FOREIGN PATENT DOCUMENTS

| CN | 105114652 A | * | 12/2015 |
| CN | 114110204 A | * | 3/2022 |
| KR | 20170114183 A | * | 10/2017 |
| KR | 101866368 B1 | * | 6/2018 |
| KR | 102053611 B1 | * | 12/2019 |

* cited by examiner

*Primary Examiner* — Hailey K. Do
(74) *Attorney, Agent, or Firm* — Maine Cernota & Curran

(57) ABSTRACT

A downstream ball valve purging inlet directs purging fluid intentionally onto a downstream portion of the valve ball. The Coanda effect attaches some of the fluid to the ball's surface, so that it flows around the ball to an opposite side thereof, thereby purging the downstream valve cavity more efficiently than designs that avoid impacting the ball and depend on mixing to distribute the purging fluid onto the ball. The purging inlet can be downstream of the ball and directed at an acute angle, proximate the ball and directed perpendicular to the outlet axis, or some combination thereof. A central cavity purging drain can be connected with the purging inlet, so that the same fluid purges both the valve interior and the downstream cavity. Embodiments include a plurality of downstream purging inlets, which can have equal purging angles and can be equally spaced about the outlet axes.

10 Claims, 16 Drawing Sheets

BALL VALVE WITH DOWNSTREAM RESIDUE PURGE

FIELD OF THE INVENTION

The invention relates to ball valves, and more particularly, to purging of process fluid residue from ball valves.

BACKGROUND OF THE INVENTION

Ball valves are robust valves that are used for many applications, sometimes under extreme operating conditions that include high temperatures and pressures. Such conditions are encountered, for example, in the petroleum industry, and in various other energy-related fields, such as apparatus that store and recover solar energy by heating and transporting molten salt. In some of these applications, when the ball valve is closed, a residual quantity of the process fluid, referred to herein as "process residue," can remain within and on the downstream side of the ball valve, where it can solidify as it cools and/or dries. This can result in a requirement for increased force when re-opening the valve, and can even result in a clogging of the valve and/or the process line downstream of the valve. For these reasons, safe and reliable operation of a ball valve, when used under these difficult conditions, can require that the interior and downstream regions of the ball valve be cleared of process residue by a well-designed purging system when the valve is closed.

With reference to the perspective view of FIG. 1A, the side sectional views of FIGS. 1B and 1C, and the top sectional view of FIG. 1D, a ball valve 100 includes a substantially spherical "ball" 102 that is penetrated by a central passage 104 and is rotated by a valve stem 114 within a seat 106 that forms a seal with the ball 102 and is within and fixed to a valve housing 107, where the housing 107 includes a valve inlet 108 and a valve outlet 110. When the valve is open, as shown in FIG. 1B, the ball 102 is rotated such that its central passage 104 aligns with the inlet 108 and outlet 110 of the valve 100, thereby allowing process fluid to flow through the valve 100 from an inlet process line to an outlet process line. Typically, as illustrated in FIGS. 1A-1C, the inlet 108 and the outlet 110 of the valve 100 are located at opposite ends of the valve, so that when the valve is open the process fluid flows in a substantially continuous "longitudinal" direction 112 through the valve 100. In embodiments where the inlet 108 and outlet 110 are not at opposing ends of the valve 100, the term "longitudinal direction" is used herein to refer to the direction in which the process fluid flows through the outlet 110.

When the valve is closed, as shown in FIG. 3. 1C-1D, the ball 102 is rotated such that the inlet 108 and outlet 110 are blocked by sides of the ball 102, thereby creating an enclosed "central cavity" within the valve 100 that includes the central passage 104 of the ball 102 as well as the space between the ball 102 and the housing 106. In addition, a region 116 immediately downstream of the ball becomes a "downstream cavity" that is open to the outlet 110 and the outlet process line, but is bounded on all other sides by the valve seat 106, the exposed section of the valve ball 102, and the walls of the valve outlet 110 and/or outlet process line. Although this downstream cavity 116 is open to the outlet process line, it is nevertheless a region where process residue can collect and solidify when the valve 100 is closed, especially when the process fluid is highly viscous, and/or when the outlet process line slopes upward as it emerges from the valve outlet.

Accordingly, when the valve 100 is closed it can be critical in some applications that process residue be cleared from within the central passage 104 of the valve ball 102, and from the region 116 immediately downstream of the valve ball 102, as quickly as possible. For this reason, some ball valves include a purging system that is configured to direct a purging fluid through the central cavity and through the downstream cavity when the ball valve is closed, thereby removing any process residue from the valve. In some cases, the purging fluid merely flushes the process residue away from the valve, while in other cases the purging fluid dissolves the process residue as it is flushed away from the valve.

With reference to the top sectional view of FIG. 1D, purging systems that clear the process residue from the central cavity of a ball valve 100 typically include a central purging inlet 118 and a central purging drain 120. Purging fluid that enters through the central purging inlet 118 is dispersed throughout the central passage 104 and throughout the space between the ball 102 and the housing 106 to flush away and/or dissolve the process residue and carry it out through the central purging drain 120.

In addition, the purging system includes a downstream purging inlet 122. A downstream purging drain is not needed, because the purging fluid is able to drain away from the downstream cavity through the downstream process line, together with the flushed and/or dissolved process residue. The need for clearing the process residue away from the downstream cavity is greatest in the region 116 that surrounds the exposed section of the ball 102. However, the structure of the valve 100 requires that all purging ports enter the valve laterally, i.e. from the sides of the valve. For this reason, with continuing reference to FIG. 1D, and with reference to the simplified illustrations of FIGS. 1E and 1F, the downstream purging inlet 122 is generally offset longitudinally downstream of the valve ball 102, so that the purging fluid 126 is not blocked by the ball 102 and can freely reach the far side of the downstream cavity. Typically, as shown if FIGS. 1D-1F, the downstream purging inlet 122 laterally directs the purging fluid such that it just brushes past the longitudinal apex 128 of the valve ball 102.

This approach depends primarily on a turbulent secondary flow 130 of the purging fluid 126 to distribute the fluid to the region 116 immediately surrounding the ball 102 and abutting the juncture between the ball 102 and the valve seat 106. As a result, the purging fluid is rendered less effective, both in flushing and in dissolving the process residue, such that the time and the amount of purging fluid that are required to clear the process residue away from the downstream cavity is increased.

What is needed, therefore, is a ball valve that can purge process residue away from the downstream cavity of the valve with increased speed and efficacy, while requiring less purging fluid.

SUMMARY OF THE INVENTION

The present invention is a ball valve that can purge process residue away from the downstream cavity of the valve with increased speed and efficacy, while requiring less purging fluid. Rather than positioning and directing the purging fluid so that it avoids impacting the ball, the downstream purging inlet is positioned and directed such that the purging fluid intentionally impacts the ball.

The present invention was enabled by the realization of the inventors that if a flow of purging fluid impacts the ball, it will not be blocked from reaching the far side of the ball, but instead will be directed around the ball so that it reaches most of the surface of the ball and of the adjacent valve seat as a direct flow. This is because, upon impacting the ball, at least some of the purging fluid is attached to the surface of the ball due to the Coanda effect, such that it follows the curve of the ball to reach the far side of the cavity.

According to the Coanda effect, fluid that emerges from a nozzle and flows adjacent and parallel to a surface will tend to become attached to the surface, such that it will follow the surface even if the surface is convexly curved. The present invention causes the purging fluid to emerge from the downstream purging inlet, which functions as a nozzle, and to impact the ball in a direction that is co-planar with the central axis of the valve outlet. As the stream of fluid strikes the ball, some of the fluid at the outer perimeter of the stream is reflected away from the ball, while the remaining fluid is divided into two streams that proceed to follow the convex surface of the ball on either side thereof. This is because the inner regions of the fluid stream are constrained by the outer regions of the stream to remain close to the surface of the ball, and are thereby attached to the ball by the Coanda effect.

The reflected portion of the purging fluid stream strikes the nearer portions of the valve seat, inlet walls, and other regions within the downstream cavity, while the remaining fluid continues along the surface of the ball and efficiently flushes away and/or dissolves any process residue that has been deposited on or near the ball. And when the two attached streams converge at the far side of the ball, they collide and are driven away from the ball into the surrounding space "behind" the ball, i.e. into the region proximate the ball that is directly opposite to the location of the downstream purging inlet.

In some embodiments, the purging angle, i.e. the angle between the longitudinal axis of the valve (process flow direction) and the purging fluid flow direction is 90 degrees, and the location of the downstream purging inlet is axially shifted so that the stream of purging fluid strikes the ball. In other embodiments, the purging angle is acute, thereby enabling the downstream purging inlet to be axially located further from the ball, for example in the same location where a conventional perpendicular purging inlet might otherwise be located. In various embodiments, the purging angle between 30 and 90 degrees, in some of these embodiments between 60 and 90 degrees, and in some of these embodiments between 80 and 90 degrees.

Embodiments further include a central purging inlet and central purging drain that enables purging of the central cavity of the ball valve. In some of these embodiments, the central purging drain is connected to the downstream purging inlet, so that the same purging fluid can flow through the central cavity and then into the downstream cavity.

The present invention is a ball valve configured to control a flow therethrough of a process fluid. The ball valve includes a valve housing having a valve inlet and a valve outlet, the valve outlet surrounding a longitudinal axis thereof, a valve seat being within and fixed to the valve housing, a ball element rotatable within the valve seat and forming a seal therewith, the ball element being penetrated by a central passage that is aligned with the valve inlet and the valve outlet and forms a fluid interconnection therebetween when the ball element is rotated to an open position, the valve inlet being isolated from the valve outlet when the ball element is rotated to a closed position, and a downstream purging inlet configured, when the ball element is in the closed position, to direct a purging fluid in a purging inlet direction onto a downstream portion of the ball element, said purging inlet direction being co-planar with said longitudinal axis.

When the ball is in the closed position, the downstream portion of the ball extends downstream from the valve seat to an apex that is longitudinally offset from the valve seat by an incursion distance, and the downstream purging inlet directs the stream of purging fluid onto an impact location on the downstream portion of the ball element, said impact location being longitudinally offset downstream from the valve seat by an impact distance, a ratio of the impact distance divided by the incursion distance being less than 0.9.

In embodiments, an angle between the longitudinal axis and the purging inlet direction is between 30 degrees and 90 degrees.

In any of the above embodiments, an angle between the longitudinal axis and the purging inlet direction can be between 60 degrees and 90 degrees.

In any of the above embodiments, an angle between the longitudinal axis and the purging inlet direction can be between 80 degrees and 90 degrees.

Any of the above embodiments can further include a central purging inlet and a central purging drain, said central purging inlet and central purging drain being in fluid communication with the central passage of the ball element when the ball element is in the closed position, said central purging inlet and a central purging drain being isolated from the central passage of the ball element when the ball element is in the open position. In some of these embodiments, the central purging drain is in fluid communication with the downstream purging inlet.

In any of the above embodiments, the ratio of the impact distance divided by the incursion distance can be less than 0.9.

In any of the above embodiments, the ratio of the impact distance divided by the incursion distance can be less than 0.8.

In any of the above embodiments, the ratio of the impact distance divided by the incursion distance can be between 0.4 and 0.6.

In any of the above embodiments, the downstream purging inlet can be a first downstream purging inlet included in a plurality of downstream purging inlets, all of which are configured, when the ball element is in the closed position, to direct purging fluid onto corresponding impact locations on the downstream portion of the ball element. In some of these embodiments, all of the impact locations are longitudinally offset downstream from the valve seat by the same impact distance. In any of these embodiments, the downstream purging inlets can be spaced circumferentially around the longitudinal axis. And in any of these embodiments the downstream purging inlets can be equally spaced circumferentially around the longitudinal axis.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a ball valve that can purge process residue away from the downstream cavity of the valve with increased speed and efficacy, while requiring less purging fluid.

Figure 1A:
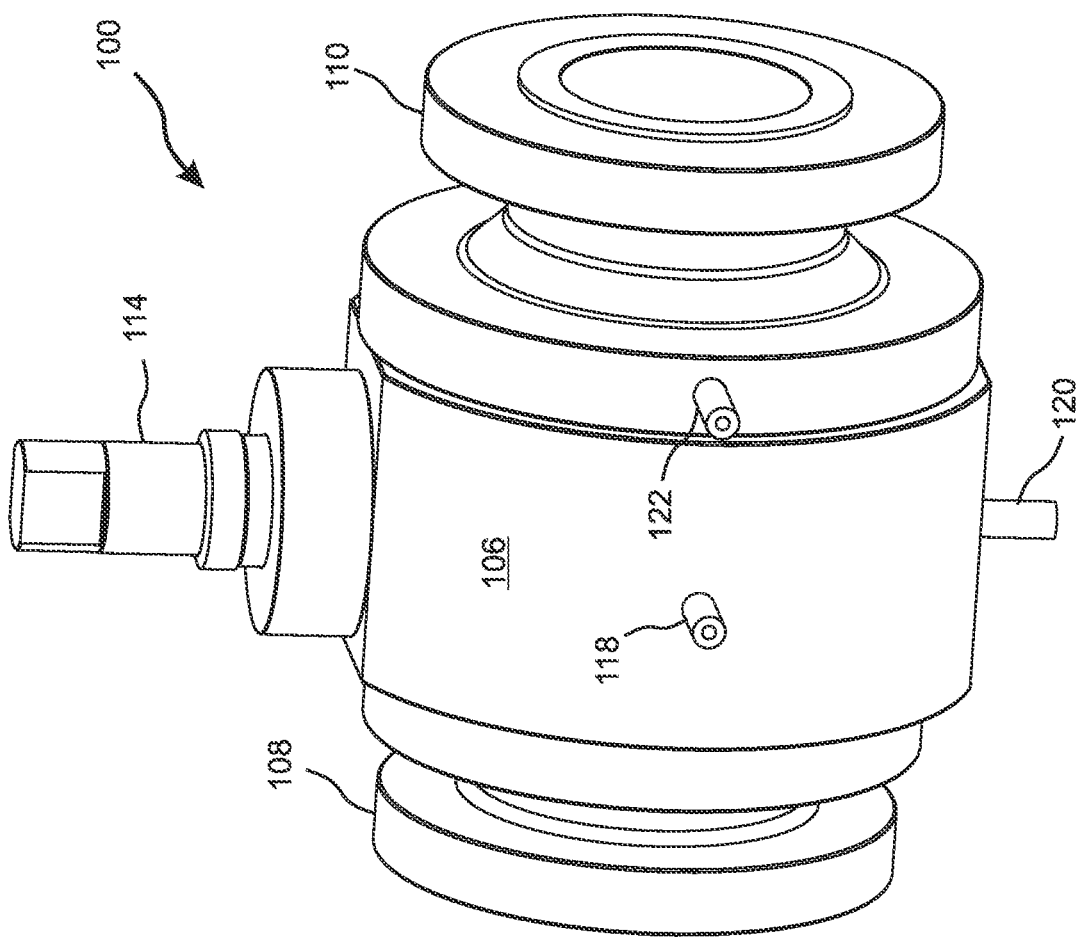
FIG. 1A is a side perspective view of a ball valve of the prior art.
Figure 1B:
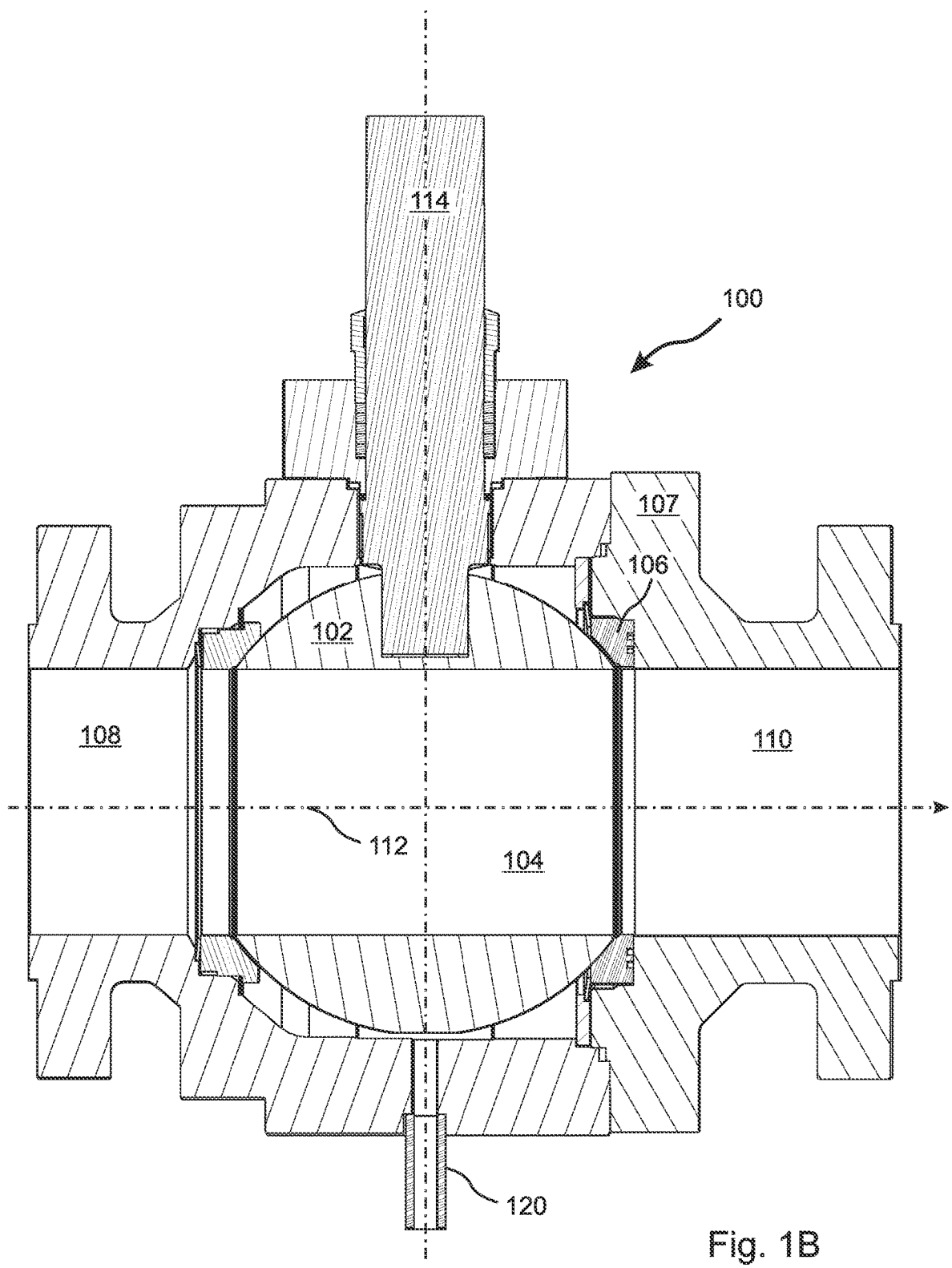
FIG. 1B is a sectional side view of the valve of FIG. 1A shown with the valve open.
Figure 1C:
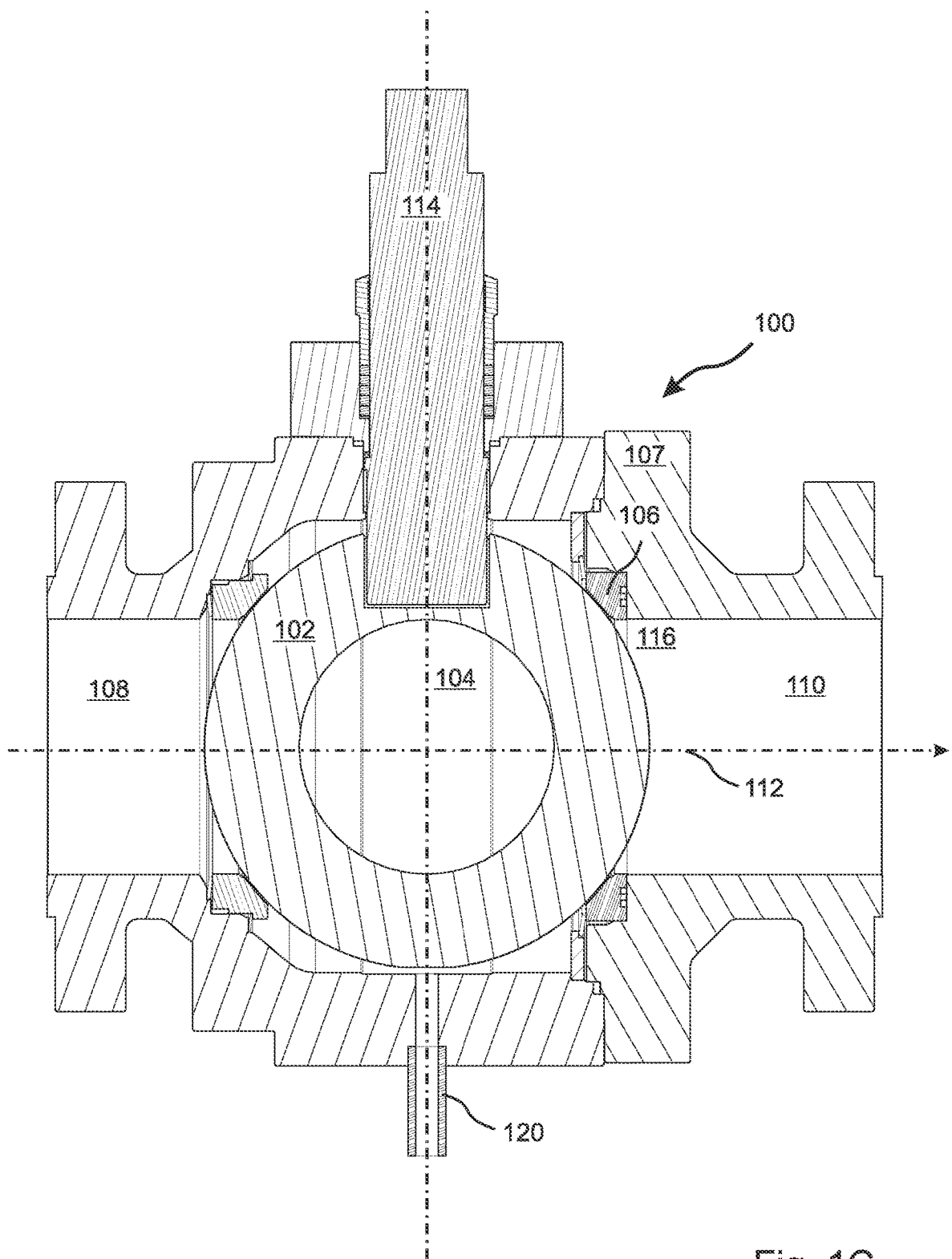
FIG. 1C is a sectional side view of the valve of FIG. 1A shown with the valve closed.
Figure 1D:
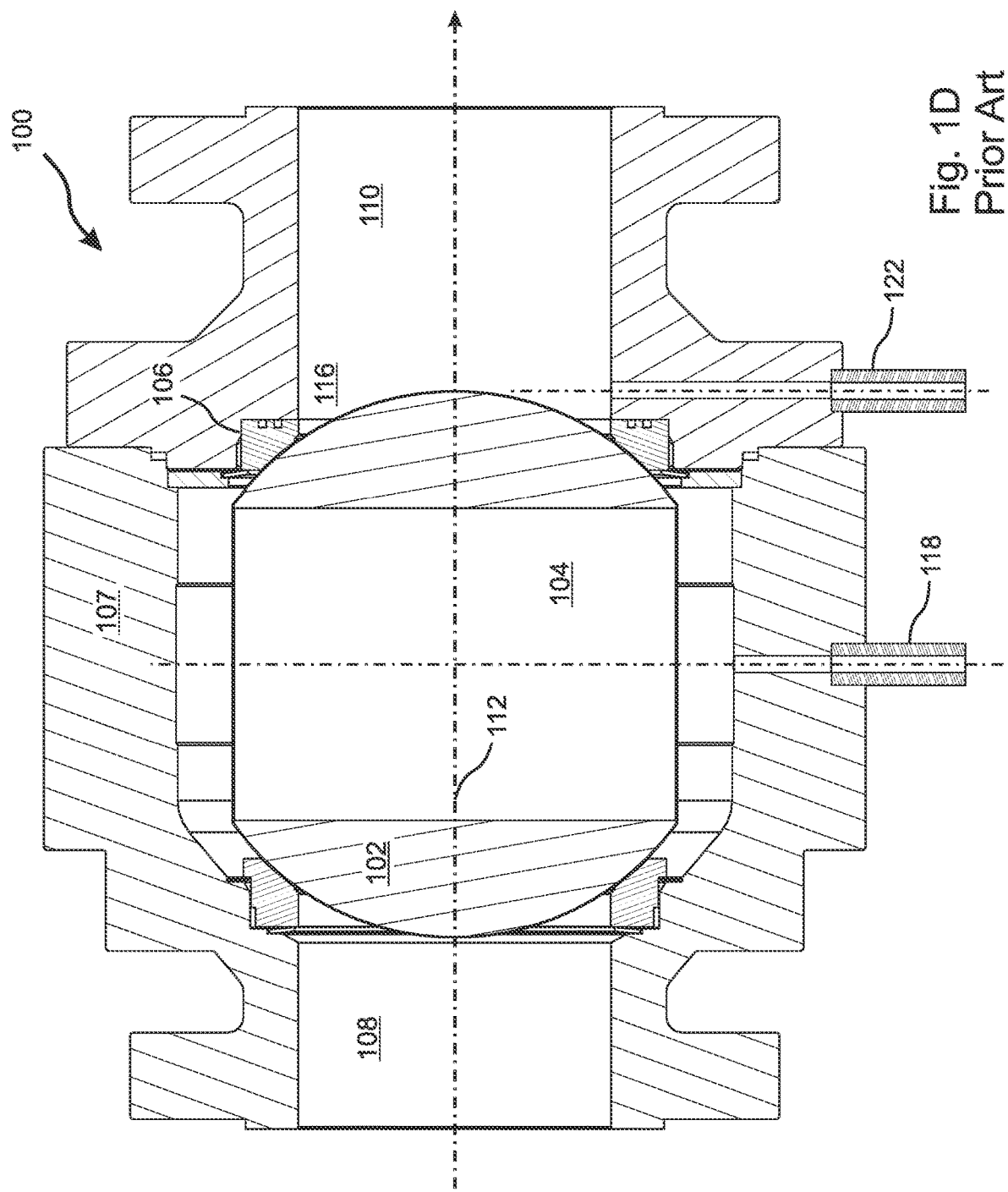
FIG. 1D is a sectional top view of the valve of FIG. 1C.
Figure 1E:
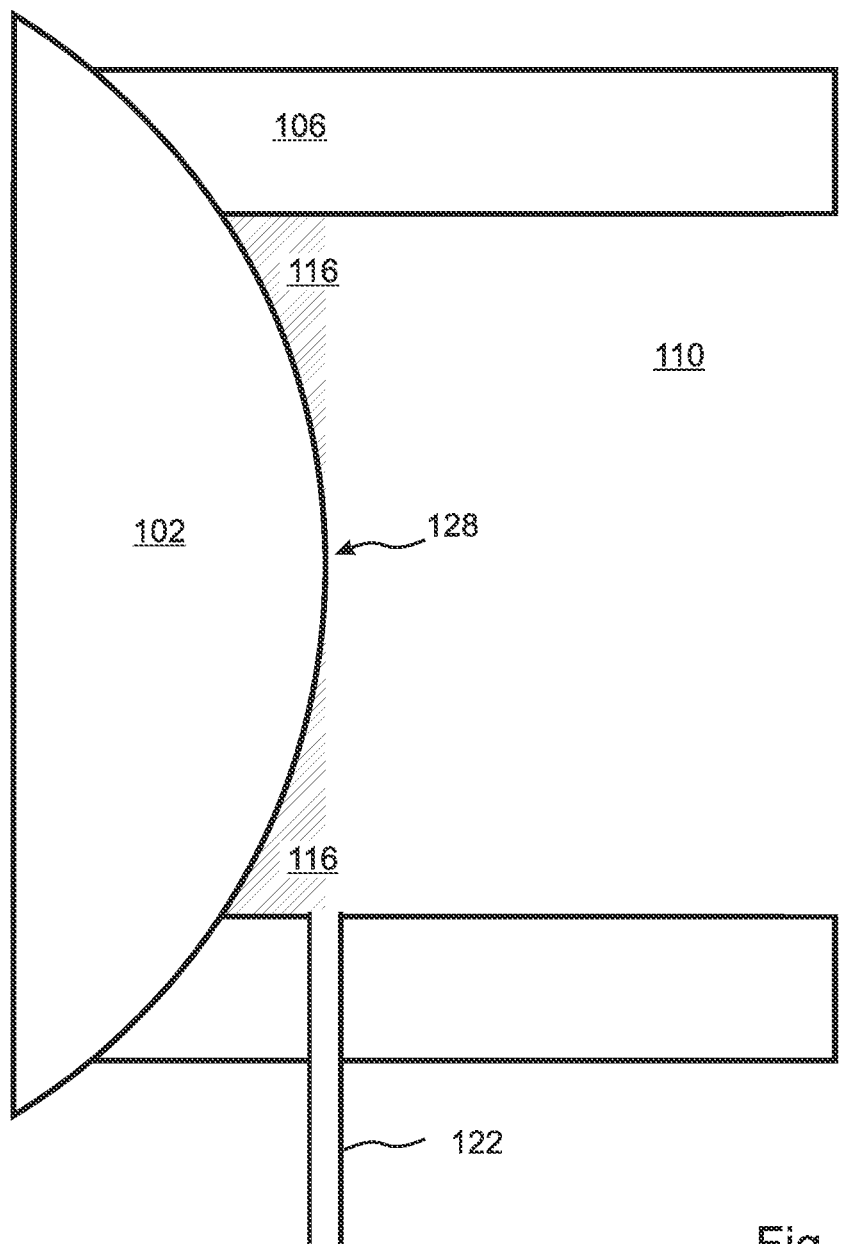
FIG. 1E is a simplified cross-sectional top view of the downstream region of a ball valve of the prior art.
Figure 1F:
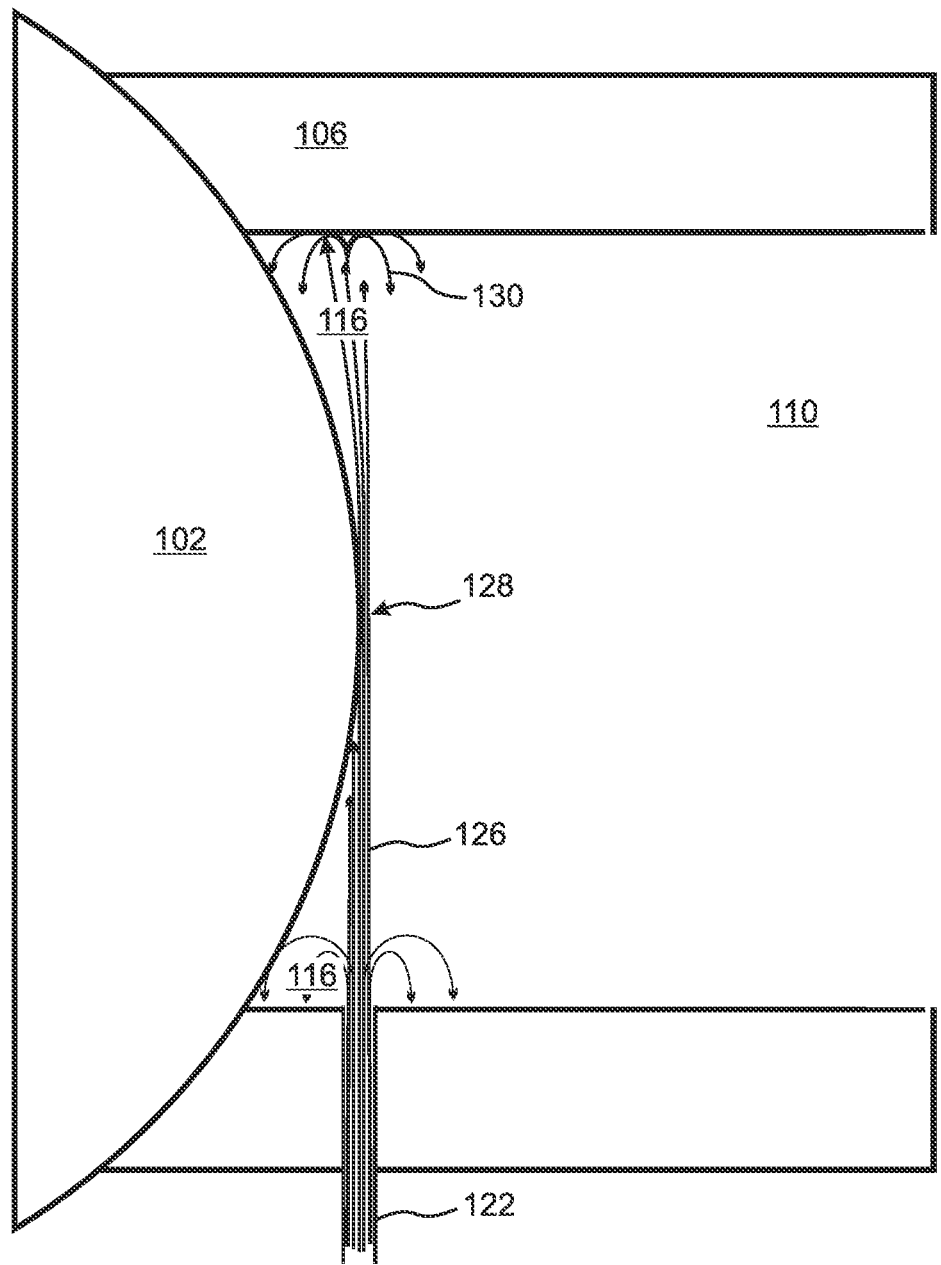
FIG. 1F illustrates the valve of FIG. 1E shown while a purging fluid is being injected into the downstream purging port.
Figure 2A:
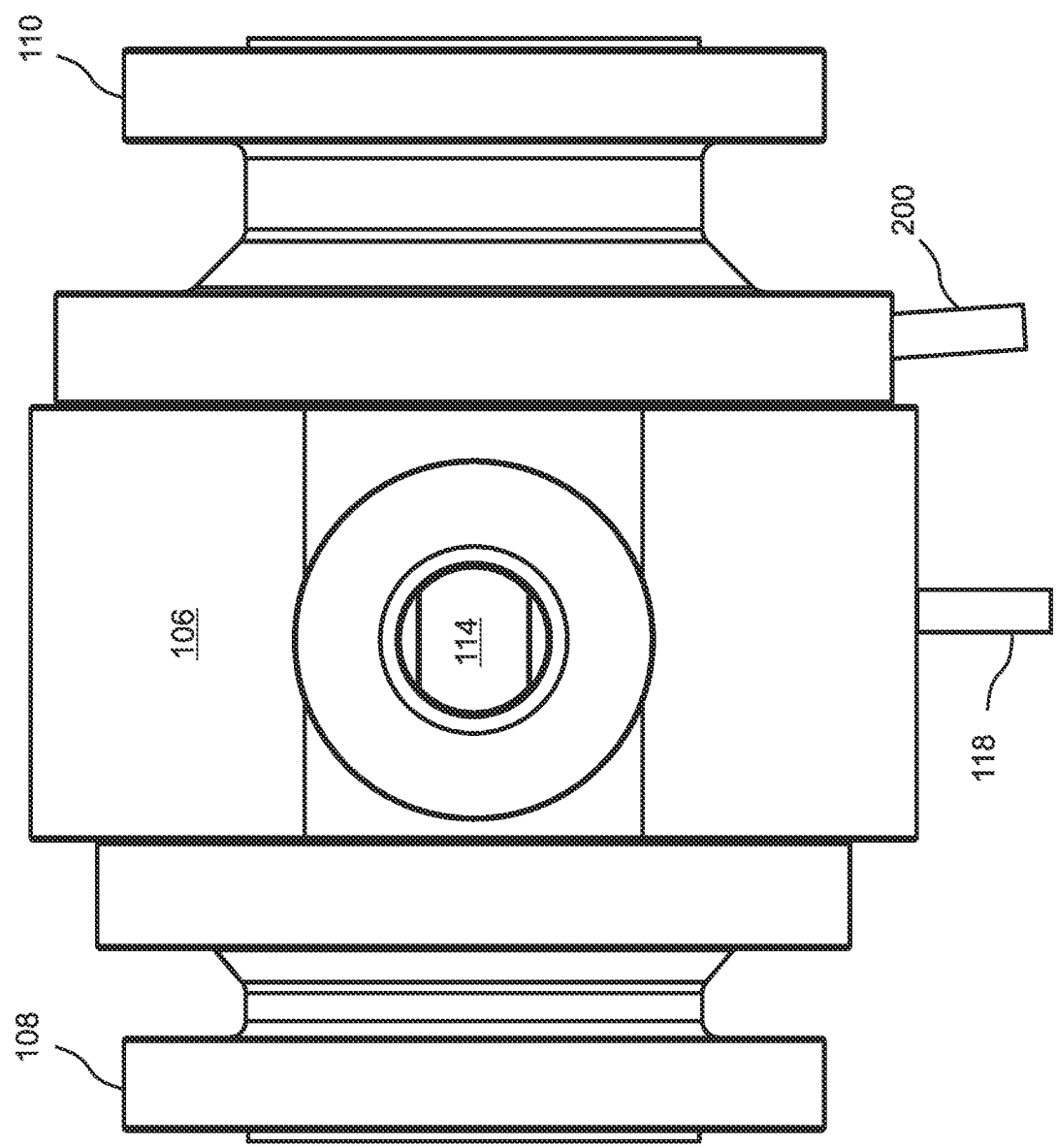
FIG. 2A is a top view of a ball valve in an embodiment of the present invention.
Figure 2B:
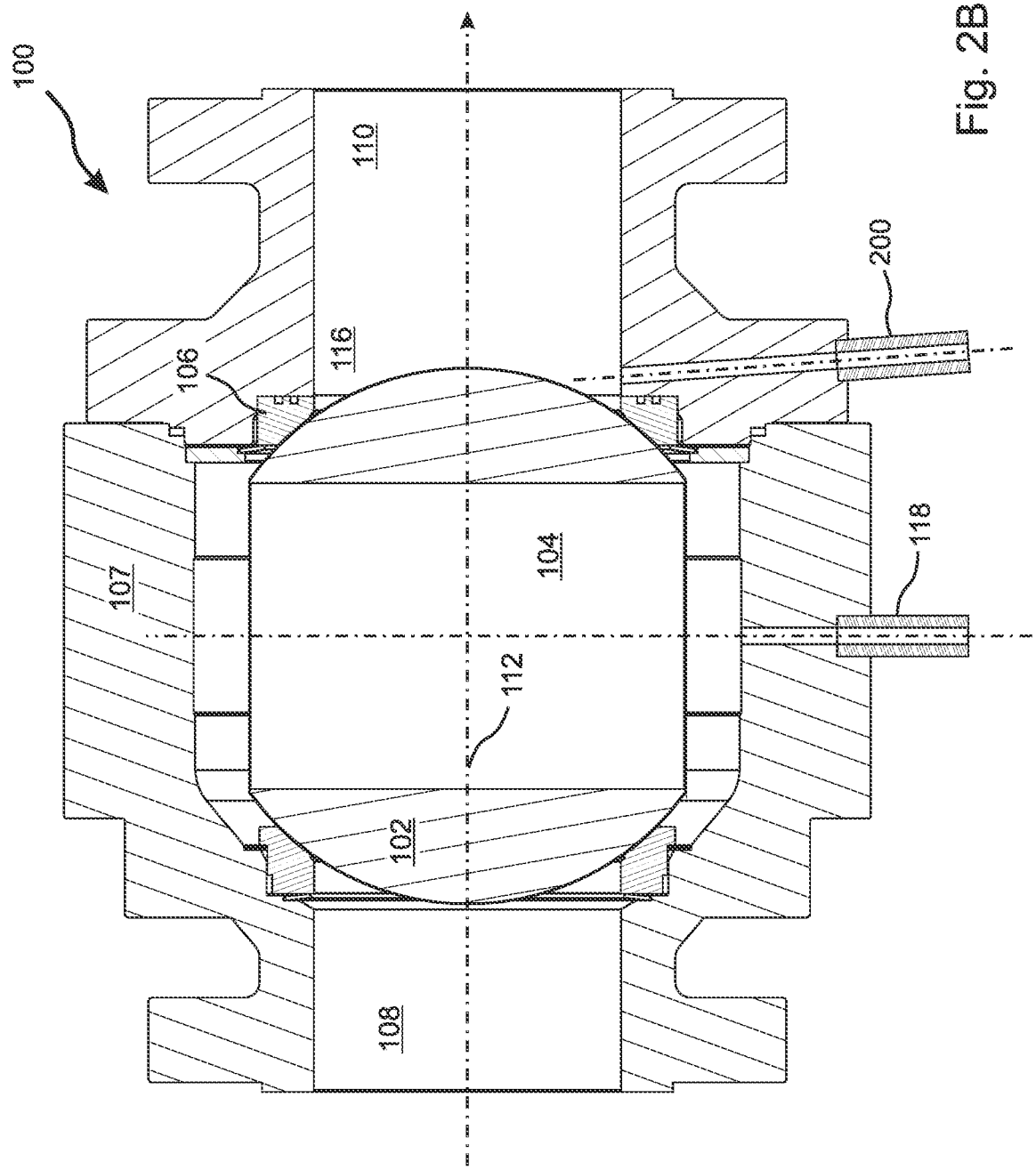
FIG. 2B is a top sectional view of the ball valve of FIG. 2A, shown in the closed configuration.
Figure 3A:
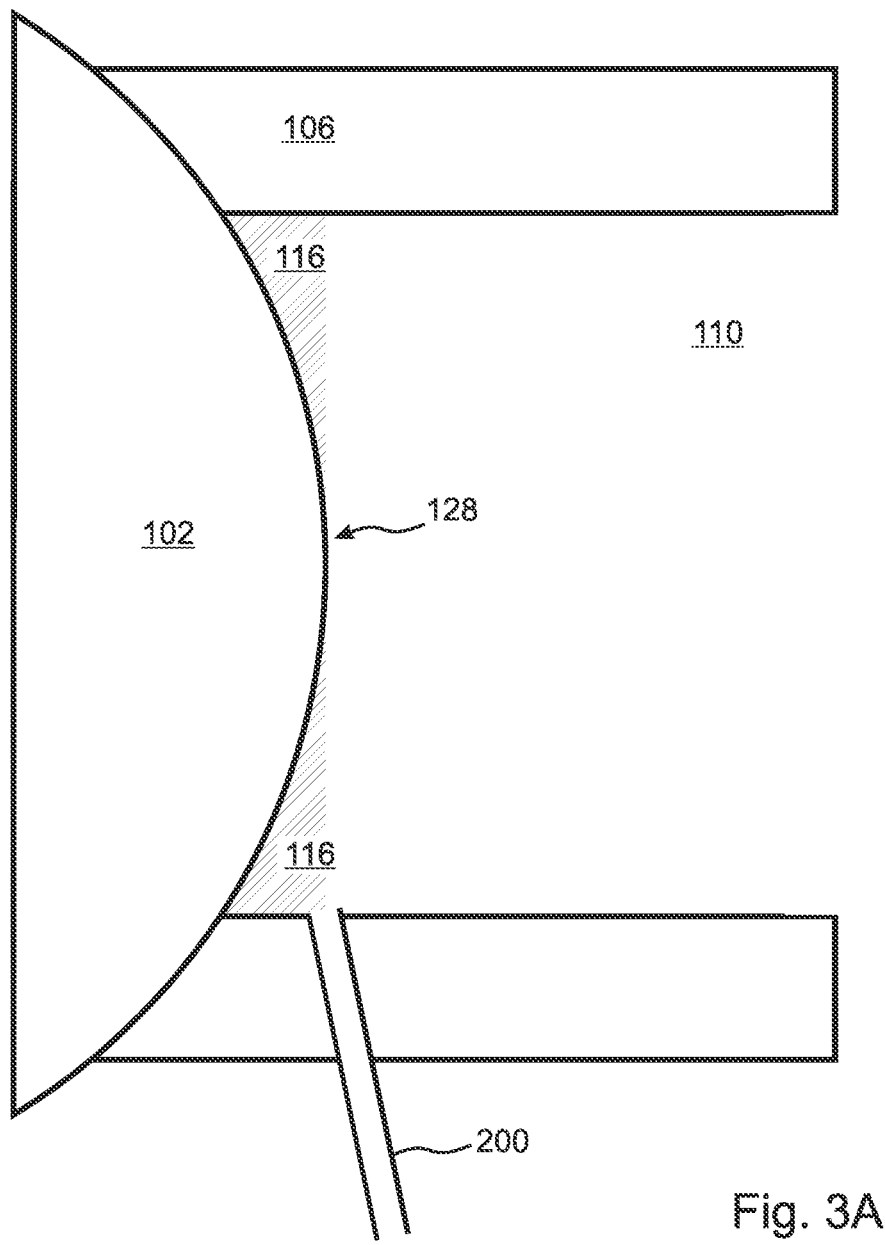
FIG. 3A is a simplified cross-sectional top view of the downstream region of a ball valve in an embodiment of the present invention where the purging angle is acute.
Figure 3B:
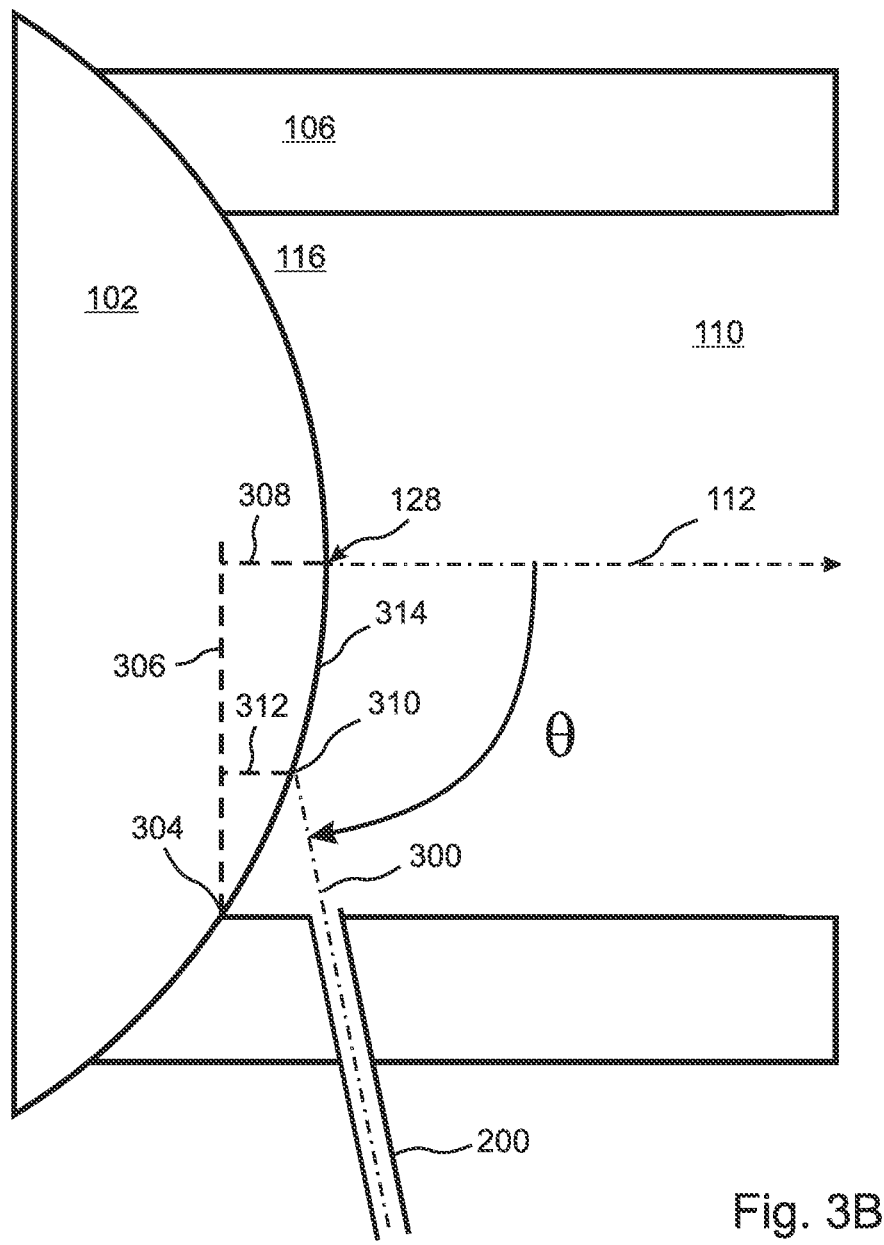
FIG. 3B is a simplified cross-sectional view similar to FIG. 3A, where the purging angle, the incursion distance, and the impact distance are graphically indicated.

With reference to the top view of FIG. 2A, the top sectional view of FIG. 2B, and the simplified illustrations of FIGS. 3A and 3B, rather that positioning and directing the downstream purging inlet 200 so that the purging fluid avoids impacting the ball 102, the downstream purging inlet 200 is positioned and directed such that the purging fluid intentionally impacts the ball 102.

Figure 4:
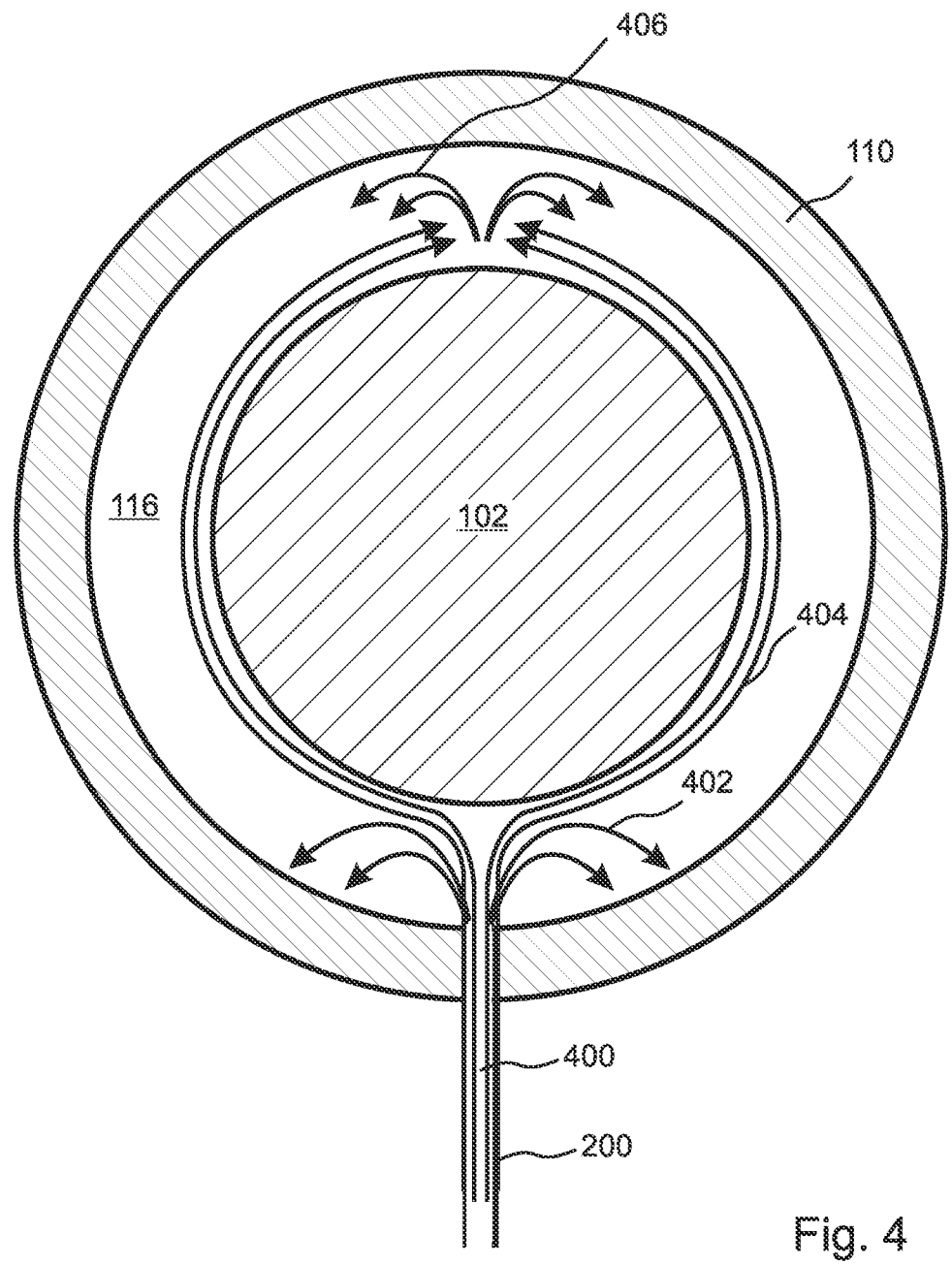
FIG. 4 is a simplified cross-sectional end view that illustrates a flow of purging fluid past a downstream portion of the ball of a ball valve according to an embodiment of the present invention.

The present invention causes the purging fluid to emerge from the downstream purging inlet 200, which functions as a nozzle, and to impact the ball 102 in a direction that is co-planar with the central axis 112 of the valve outlet. With reference to FIG. 4, as the stream of fluid 400 strikes the ball 102, some of the fluid at the outer perimeter of the stream 402 is reflected away from the ball 102, while the remaining fluid 404 is divided into two streams that proceed to follow the convex surface of the ball 102 on either side thereof. This is because the inner regions 404 of the fluid stream 400 are constrained by the outer regions 402 of the stream 400 to remain close to the surface of the ball 102, and are thereby attached to the ball 102 by the Coanda effect.

The reflected portion 402 of the purging fluid stream 400 strikes the nearer portions of the valve seat 106, inlet walls, and other regions within the downstream cavity 116, while the remaining fluid 404 continues along the surface of the ball 102 and efficiently flushes away and/or dissolves any process residue that has been deposited on or near the ball 102. And when the two attached streams 404 converge at the far side of the ball 102, they collide with each other to form an outwardly deflected fluid flow 406 that is driven away from the ball 102 into the surrounding space "behind" the ball, i.e. into the region proximate the ball 102 that is directly opposite to the location of the downstream purging inlet 200.

With reference again to FIG. 3B, the stream of purging fluid 300 impacts the ball 102 at a location 310 that is on a curved line 314 that lies in the plane of the longitudinal axis 112 of the valve outlet 110 and extends between the apex 128 of the ball and the juncture 304 where the ball 102 emerges from the seat 106. A vertical line 306 is indicated in FIG. 3B that extends from the juncture 304 perpendicular to and in the plane of the longitudinal axis 112 of the valve outlet 110. An incursion distance 308 is thereby defined as the distance between this line 306 and the apex 308 of the ball 102, which is the distance by which the ball 102 extends beyond the seat 106 into the outlet 110. The stream of purging fluid 300 impacts the ball 102 at a point 310 on the curved line 314 that is offset from the dashed line 306 by an impact offset 312 that is less than the incursion distance 308. In embodiments, the ratio of the impact offset 312 to the incursion distance 308 is less than 0.9, and in some of these embodiments it is less than 0.8. In various embodiments, this ratio is between 0.4 and 0.6.

In the embodiment of FIGS. 2A-3B, the purging angle, i.e. the angle θ between the longitudinal axis 112 of the valve outlet 110 (process flow direction) and the purging fluid flow direction 300 is acute, thereby enabling the downstream purging inlet 200 to be axially offset from the ball 102, for example in the same location where a conventional perpendicular purging inlet 122 might otherwise be located.

Figure 5:
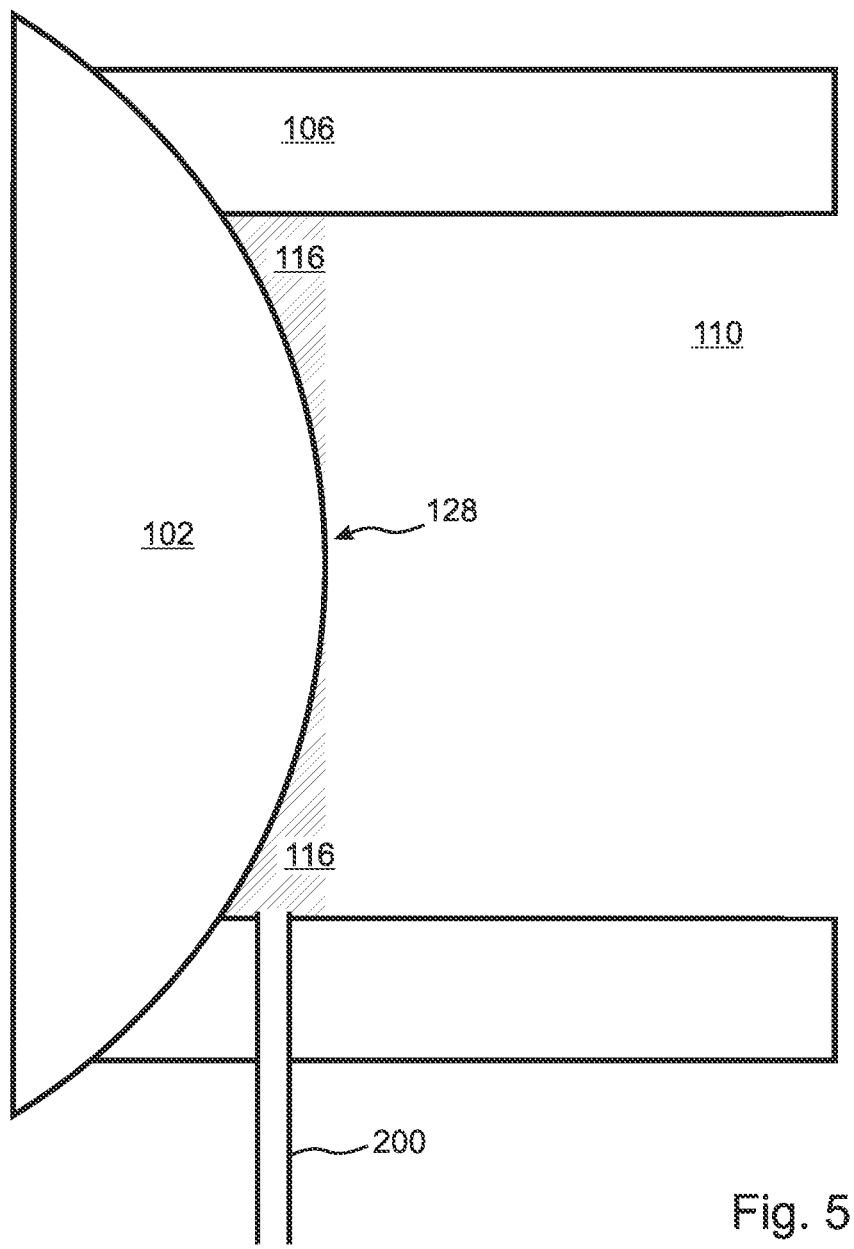
FIG. 5 is a simplified cross-sectional top view of the downstream region of a ball valve in an embodiment of the present invention where the purging angle is a right angle.

With reference to FIG. 5, in other embodiments the purging angle θ is 90 degrees, and the location of the downstream purging inlet 200 is axially shifted closer to the ball 102 so that the stream of purging fluid 400 strikes the ball 102. In various embodiments, the purging angle θ is between 30 and 90 degrees, in some of these embodiments between 60 and 90 degrees, and in some of these embodiments between 80 and 90 degrees.

Figure 6A:
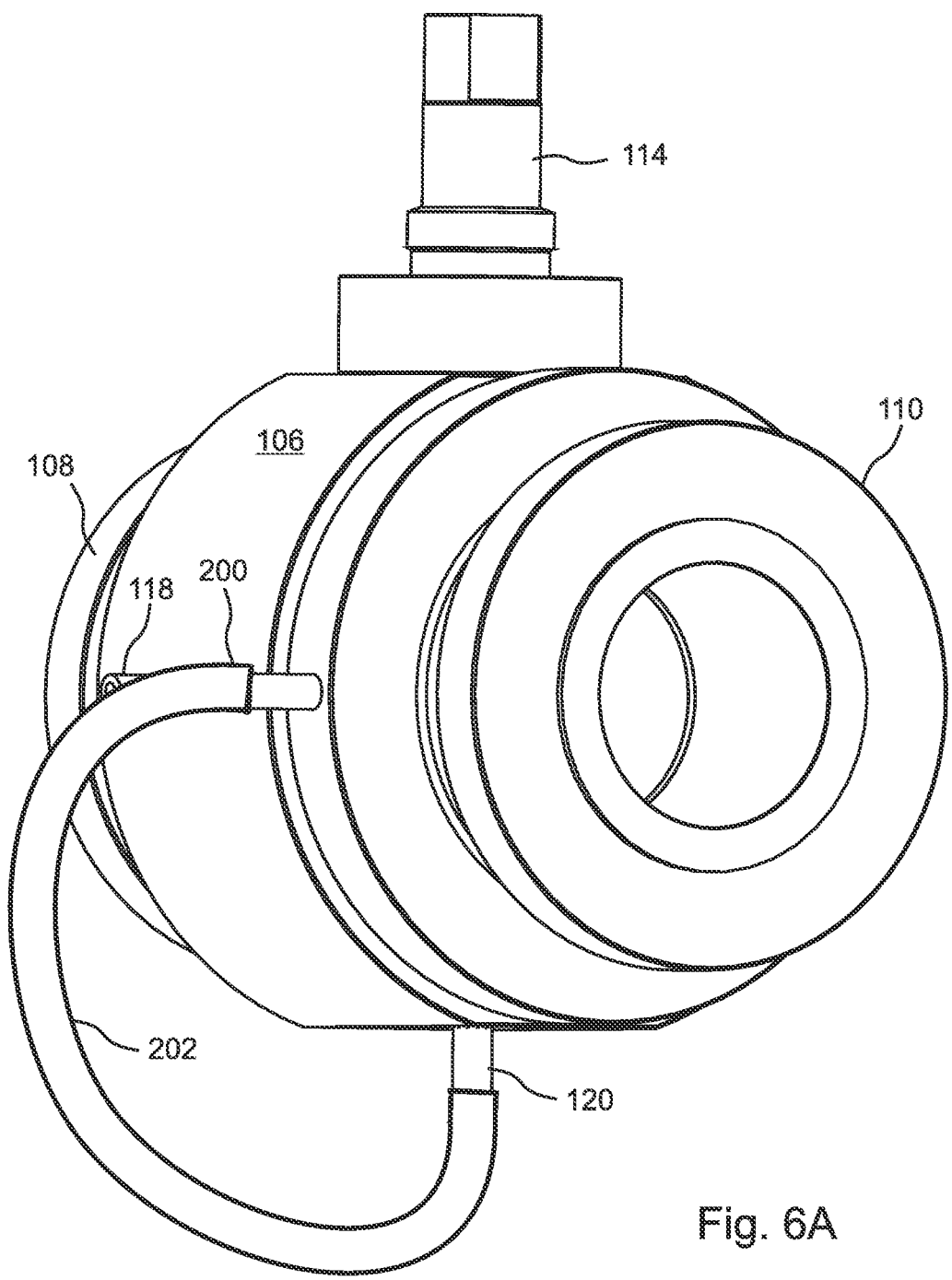
FIG. 6A is a perspective view of an embodiment of the present invention where the central purging drain is connected to the downstream purging inlet.

With reference again to FIG. 2B, embodiments further include a central purging inlet 118 that enables purging of the central cavity of the ball valve. With reference to FIG. 6A, in some of these embodiments, the central purging drain 120 is connected 202 to the downstream purging inlet 200, so that the same purging fluid can flow through the central cavity 104 and then into the downstream cavity 116.

Figure 6B:
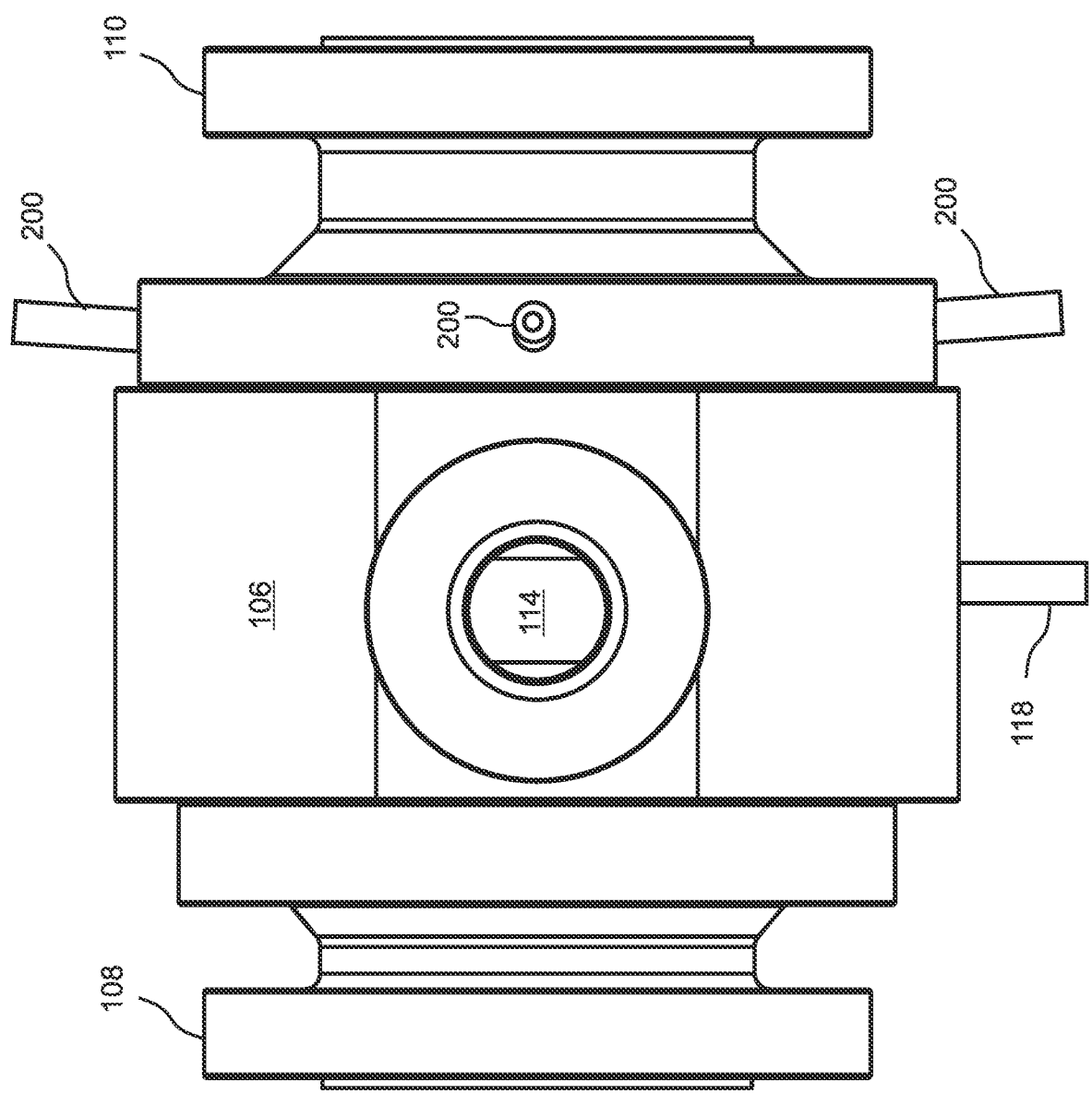
FIG. 6B is a top view of an embodiment of the present invention that includes a plurality of downstream purging inlets.

With reference to the top view of FIG. 6B, some embodiments include a plurality of downstream purging inlets 200, which can be spaced about the central axis 112 of the outlet 110.

Figure 7A:
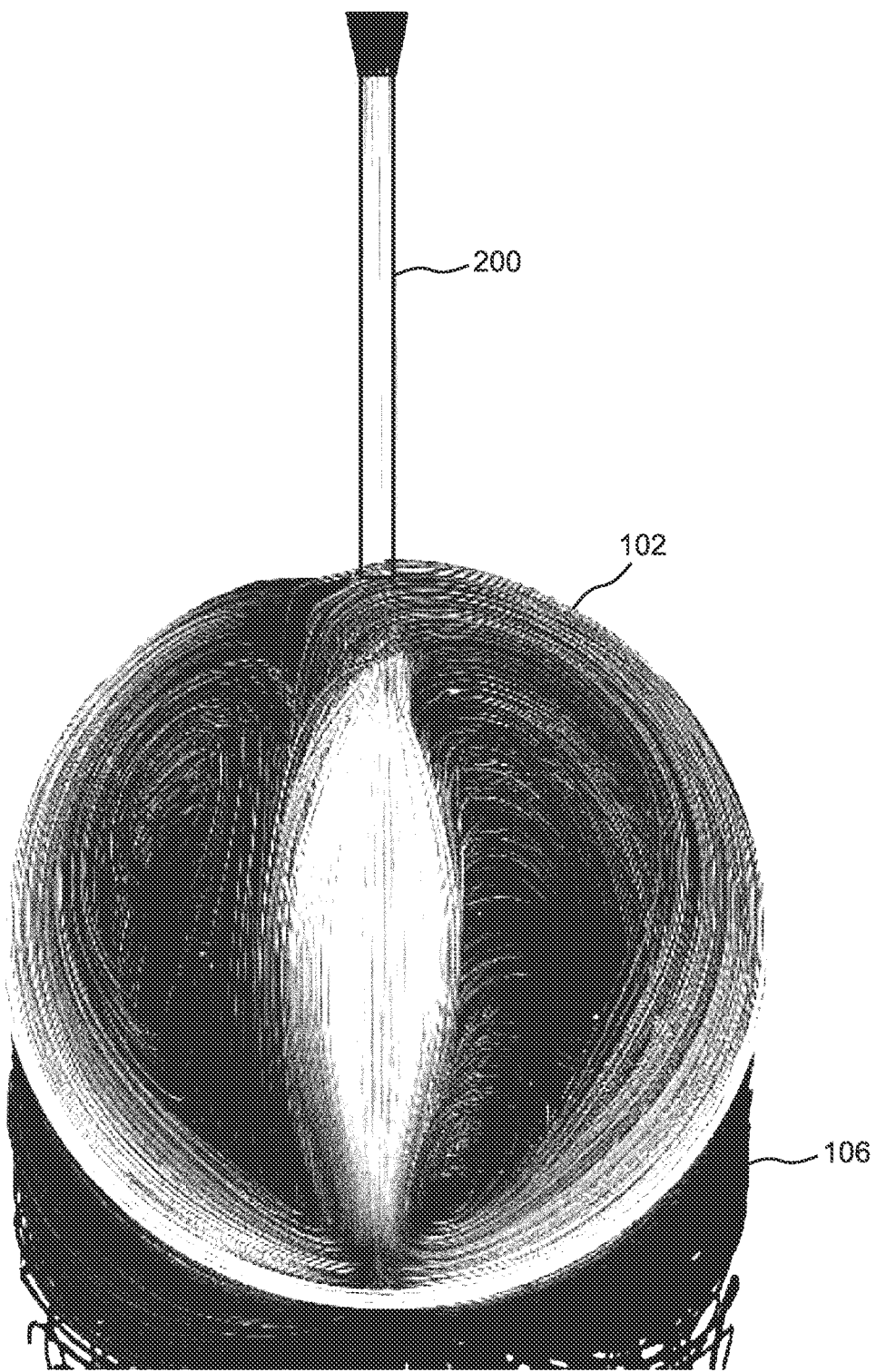
FIG. 7A illustrates a result of a simulation of downstream purging fluid flow for a prior art ball valve.
Figure 7B:
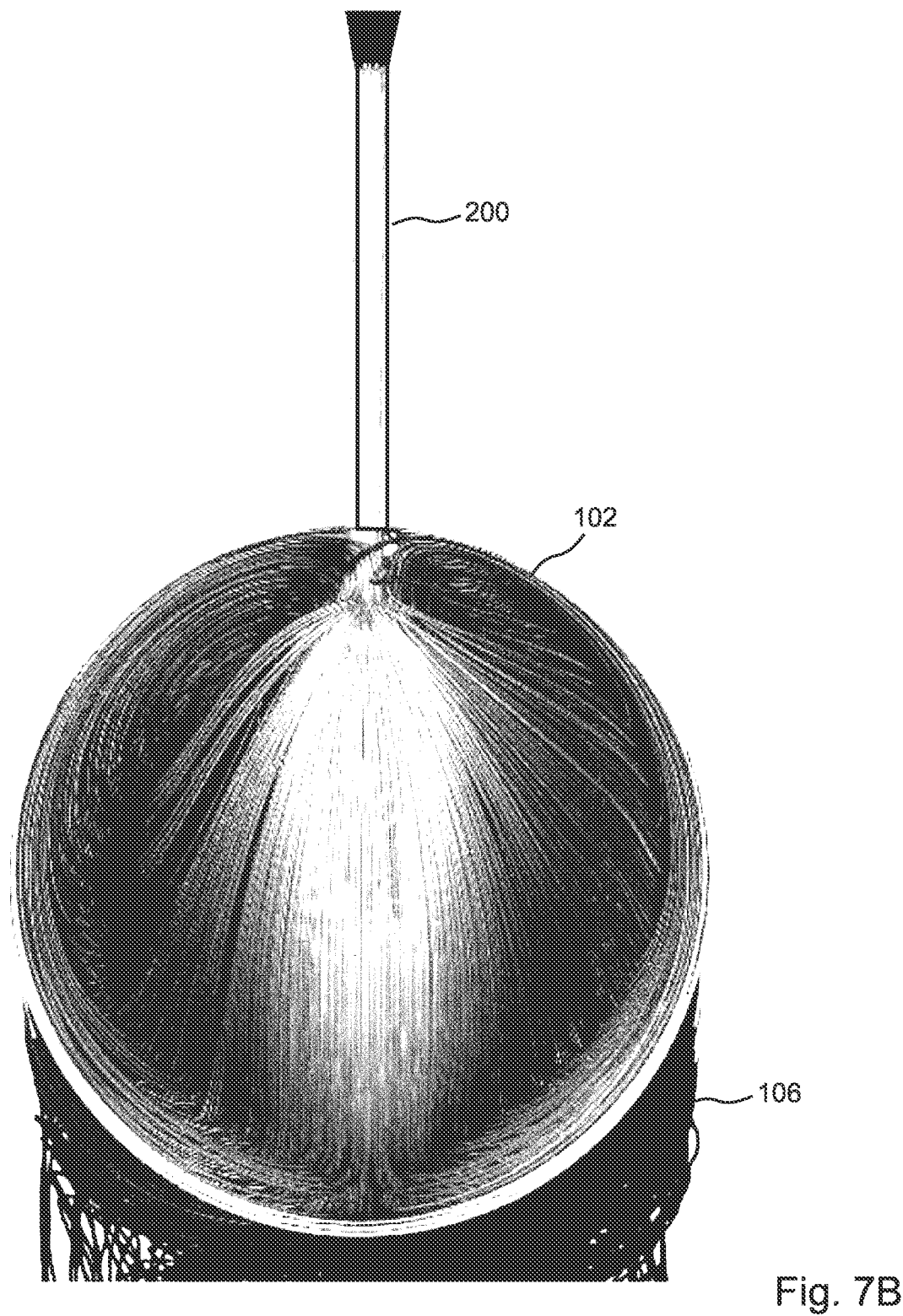
FIG. 7B illustrates a result of a simulation of downstream purging fluid flow for a ball valve in an embodiment of the present invention.

With reference to FIGS. 7A and 7B, simulations were performed to compare several flow and geometrical parameters of embodiments of the present invention with corresponding examples of the prior art. It was found that if the purging fluid were directed to an impact location on the ball 102 that was between the seat 106 and ball 102, process fluid residue was removed more efficiently as compared to the prior art. In addition, it could be seen that the flow of purging fluid near the surface of the ball 102 was more uniform and the sizes of the recirculation zones were reduced.

Several different scenarios with different purge pressures and geometries were investigated by means of computational fluid dynamics (CFD) simulations using ANSYS FLUENT.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A ball valve configured to control a flow therethrough of a process fluid, the ball valve comprising:
   a valve housing having a valve inlet and a valve outlet, the valve outlet surrounding a longitudinal axis thereof, a valve seat being within and fixed to the valve housing;
   a ball element rotatable within the valve seat and forming a seal therewith, the ball element being penetrated by a central passage that is aligned with the valve inlet and the valve outlet and forms a fluid interconnection therebetween when the ball element is rotated to an open position, the valve inlet being isolated from the valve outlet when the ball element is rotated to a closed position; and
   a downstream purging inlet configured, when the ball element is in the closed position, to direct a purging fluid in a purging inlet direction onto a downstream portion of the ball element, said purging inlet direction being co-planar with said longitudinal axis and perpendicular to said longitudinal axis;
   wherein when the ball is in the closed position:
   the downstream portion of the ball extends downstream from the valve seat to an apex that is longitudinally offset from the valve seat by an incursion distance;
   the downstream purging inlet is located at a purging inlet location that is longitudinally offset downstream from the valve seat by a purging inlet distance that is less than the incursion distance; and
   the downstream purging inlet directs the stream of purging fluid onto an impact location on the downstream portion of the ball element, said impact location being longitudinally offset downstream from the valve seat by an impact distance
   a ratio of the purging inlet distance divided by the incursion distance being less than 0.9.

2. The ball valve of claim 1, wherein the ratio of the impact distance divided by the incursion distance is less than 0.9.

3. The ball valve of claim 1, wherein the ratio of the impact distance divided by the incursion distance is less than 0.8.

4. The ball valve of claim 1, wherein the ratio of the impact distance divided by the incursion distance is between 0.4 and 0.6.

5. The ball valve of claim 1, further comprising a central purging inlet and a central purging drain, said central purging inlet and said central purging drain being in fluid communication with the central passage of the ball element when the ball element is in the closed position, said central purging inlet and said central purging drain being isolated from the central passage of the ball element when the ball element is in the open position.

6. The ball valve of claim 5, wherein the central purging drain is in fluid communication with the downstream purging inlet.

7. The ball valve of claim 1, wherein the downstream purging inlet is a first downstream purging inlet included in a plurality of downstream purging inlets, all of which are configured, when the ball element is in the closed position, to direct purging fluid onto corresponding impact locations on the downstream portion of the ball element.

8. The ball valve of claim 7, wherein all of said corresponding impact locations are longitudinally offset downstream from the valve seat by the same impact distance.

9. The ball valve of claim 7, wherein the plurality of downstream purging inlets are spaced circumferentially around the longitudinal axis.

10. The ball valve of claim 7, wherein the plurality of downstream purging inlets are equally spaced circumferentially around the longitudinal axis.

\* \* \* \* \*